Aug. 14, 1956       W. E. MICHAELS       2,758,611
PRESSURE LINE COUPLING DEVICE
Filed March 17, 1955
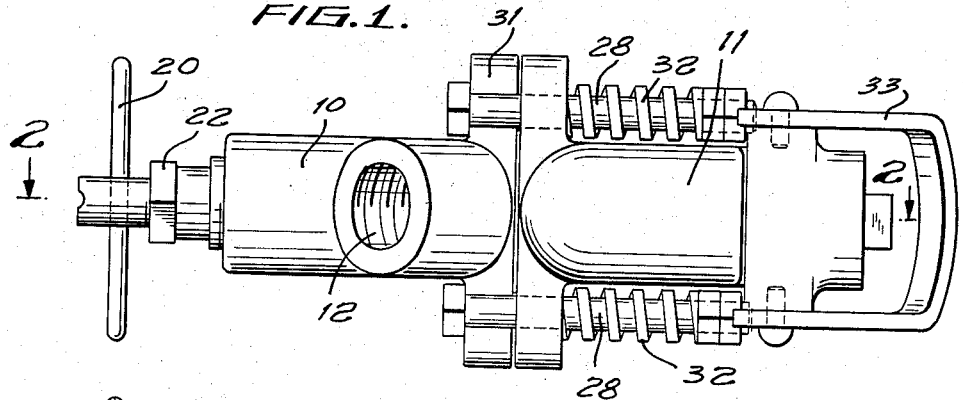
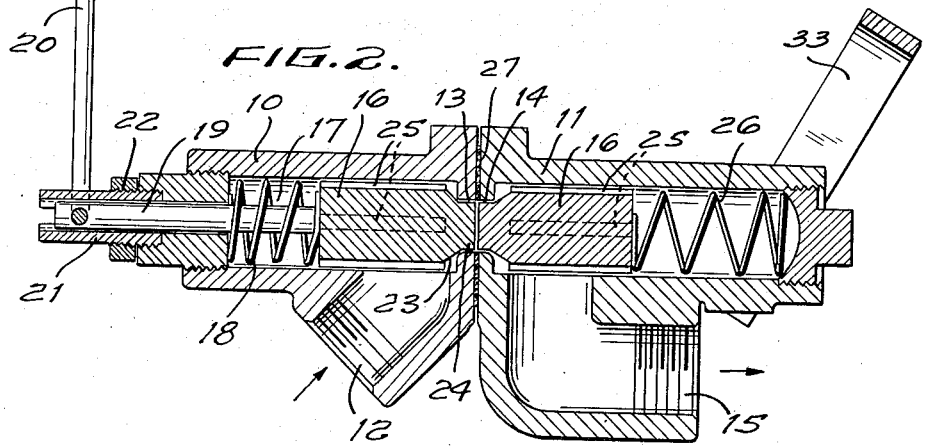
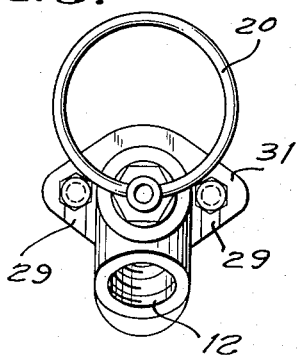 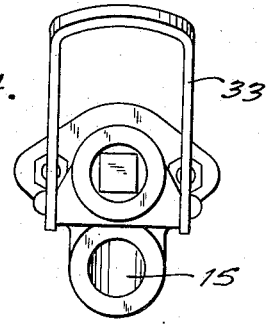
INVENTOR.
WALTER E. MICHAELS
BY
Pollard Johnston, Smythe & Robertson
ATTORNEYS

2,758,611

PRESSURE LINE COUPLING DEVICE

Walter E. Michaels, Glenmont, N. Y., assignor to Industrial Molasses Corporation, Leona, N. J., a corporation of New Jersey Application March 17, 1955, Serial No. 495,011

1 Claim. (Cl. 137—614)

This invention relates to a dual valve coupling device for fluids under pressure in pipes or other conduits.

An object of the invention is to provide a pressure line coupling device capable of maintaining the pressure in the line on both sides of the coupling when the device is uncoupled.

Another object is to provide a coupling device of the above character which is simple in construction, low in the number of parts, sturdy in construction, quick in operation and low in cost.

An important specific object is to provide such a coupling with valves so positioned that substantially no leakage and no dripping of liquid will occur when the device is uncoupled.

Broadly considered, the invention may be defined as involving a coupling device for fluid pressure lines including a supply section and a receiving section both of which have apertures or passageways therein for flow of fluid successively through said sections, including also means for coupling and uncoupling said sections in an aligned position as to said apertures, a normally closed valve opened by fluid pressure in the aperture in said receiving section operative substantially at the face thereof, automatically operating means for closing said valve upon cessation of pressure in said line, a manually operated valve in said supply section operating substantially at the face thereof, and alternately operating means for maintaining said valve in closed and open positions.

The valves in the respective sections preferably include plunger pins which slide in the apertures up to the respective adjacent faces of the said sections and are so constructed as to cause the opposed ends thereof to meet and come together thereby to leave no space therebetween to retain liquid which would flow or drip from the coupling device upon disengagement of the two sections.

The valve in the receiving section of the device is opened by the fluid pressure in the line, the pin or other closure being pushed back by pressure of the incoming stream of liquid. The opening of the valve operates against a force which later closes the valve when fluid pressure in the line is cut off by a closing of the valve in the supplying section. This force may be provided by a spring, by a weight or a lever or other conventional means.

The valve in the supply section includes a plunger pin which advances into the aperture in the section when the valve is to be closed and is pulled or otherwise forced out of the aperture extending through the section when the valve is to be opened.

The force actuating the plunger pin in closing the valve of the supply section may be provided by means of a pivoted lever having an eccentric curved section adjacent the back end of the pin but is preferably provided by a compression spring. The valve may be opened by any suitable mechanism operated by a force pulling either directly on the pin or indirectly through a lever mechanism.

The supply and receiving sections of the coupling may be engaged and disengaged by any mechanism which will insure proper alignment of the apertures in the respective sections and will operate positively and quickly. The mechanism, for example, may be a cam, lever and loop (or hooks) arrangement, the loop being pivoted to one of the sections and adapted to slip over and behind part of the other section where the cam-pivoted lever attached to the loop will force the sections together when the lever is swung downwardly to rotate the cam against the back of the section.

The locking mechanism is preferably composed of two or more spring operated slidable bolts mounted in one of the sections of the coupling such that the heads of the bolts project beyond the face of the section for gripping the other section. These bolts fit in slots in the other section with the heads falling behind the slots. The springs on the bolts pull the bolts inwardly and thus through their heads force and frictionally hold the faces of the sections together. The sections are disengaged by means of a lever or levers which contact the back ends of the bolts and forces them forward against the compression of the springs thus relieving the pressure and the contact of the heads of the bolts on the back of the slots of the opposed section thus permitting the said sections to be separated by lifting the slotted section or lowering the bolt section in such manner as to cause the slots to slip off the bolts or vice-versa.

The device of the present invention may find use anywhere that a fluid or liquid is to be flowed intermittently and the pressure is to be maintained on its receiving side as well as on its supply side. A major contemplated use is in the transfer of molasses from a pump line to a portable pressure vessel for transportation to the point of use.

The invention is exemplified by the illustration in the accompanying drawing wherein Figure 1 is a bottom plan view of the complete device, Figure 2 is a vertical section taken on line 2—2 of Figure 1 and Figures 3 and 4 are vertical sections of the respective ends of the device.

With further reference to the drawing, there is shown the coupling device having a supply section 10 and a receiving section 11, the supply section having an inlet aperture 12 and an outlet aperture 13, and the receiving section 11 having an inlet aperture 14 and an outlet aperture 15 all for passage of liquid successively through the two sections.

Within the passageway of the supply section 10, there is a valve mechanism composed of a cylindrical, slidable plunger 16 adapted on closing to engage the wall of the aperture 13. The plunger 16 moves in the chamber 17 containing also a strong compression spring 18 capable of forcing the plunger 16 into the aperture 13 against the pressure of fluid flowing through the passageway in the device. The plunger 16 is connected to a shaft 19 which has in its outer end a gripping ring 20. The chamber 17 is closed by plugs including a slotted screw plug 21 through which the pin 19 slides when the ring is pulled for opening the valve by withdrawing the plunger 16 from the aperture 13. A lock nut 22 holds the slotted screw plug 21 in its proper position.

The plunger 16 has a slanting collar 23 terminating in a projection 24 of reduced diameter. Closing of the opening is effected by contact of the collar 23 on the shoulder of aperture 13. The plunger 16 contains two or more peripheral longitudinal slots 25 to facilitate movement of the plunger in the chamber.

The valve in the receiving section 11 contains a similar plunger which is held in the closed position by the relatively weak compression spring 26 when the fluid is not flowing from the supply section through the receiving section to its point of consumption. The spring will readily give and thus permit the plunger to recede when liquid is forced against its face for flow through the aperture 14.

Between the opposed faces of the sections 10 and 11 there is a gasket 27 which may be attached to either face.

The mechanism holding the two sections together includes two bolts 28 attached to the section 11 extending through the face of the said section a sufficient distance to reach behind the flange 31 of section 10. The flange 31 contains slots 29 adapted to slip over the bolts when the bolts are forced forward against the springs. The lever 33 is pivoted to the sides of the section 10, and, by manual operation, forces the bolts 28 forward into unlocking position or such that the heads thereof do not frictionally engage the flange 31.

The operation of the coupling device is as follows: Before the device is put in use, the sections 10 and 11 would be separate from each other and a hose or pipe would be connected into aperture 12 for the supply of liquid and into aperture 15 for discharge of the liquid to a point of utilization. The plungers 16 in the respective sections would be in advanced position and would close the respective valves as shown in Figure 2.

To engage the two sections, the lever 33 is moved downwardly in such manner as to force the bolts 28 in a forward direction away from the inlet face of the section 11. To attach the other section 10, it is only necessary to place the flange face 31 against the corresponding flange of section 11 such that the slots 29 slide over the bolts 28 to a point where the apertures 13 and 14 coincide. Thereupon the lever 33 is raised and the springs 32 draw the heads of the bolts 28 against the flange 31 and firmly engage the same.

To cause flow through the respective sections, the ring 20 when in horizontal position is pulled in a direction away from the device such that the projection 14 of the plunger 16 is drawn out of the aperture 13. By pulling the ring out of the slot in plug 21 and turning it forty-five degrees the plunger will be retained in an open position, and liquid will flow from the aperture 12, out of the aperture 13, will force the plunger 16 of the section 11 against the spring and will permit flow of the liquid through the passage 14 and out of the passage 15 to the point of consumption.

When the flow of the liquid is to be discontinued the hereinbefore described steps are reversed. Due to the action of the spring 18 the plunger 14 will advance and cut off the flow by contact of the collar 23 against the shoulder of the aperture 13. With this flow stopped the spring 26 will push the plunger 16 of this section such that back flow will be prevented. The ends of the plungers meet substantially at the faces of the respective sections and in view of this fact and of the fit of the projections in the apertures 13 and 14, no liquid will leak or drip when the two sections are disengaged.

It should be understood that the invention is not limited to the specific construction shown but that it extends to all equivalents which will occur to those skilled in the art upon consideration of the scope of the claim appended hereto.

I claim:

A coupling device for fluid pressure lines which comprises, a fluid supply section and a fluid receiving section both having passages extending therethrough terminating in their opposed faces, for the flow of fluid through the device, means for coupling and uncoupling said sections with the passages in aligned position, including at least two laterally moveable lugs extending out from the face of one of the sections on opposite sides thereof, a corresponding number of slots in a flange similarly positioned on the other section adapted to engage heads of said lugs, compression spring means coacting with said lugs and slots for holding the faces of the sections together during flow of fluid through the coupling device, and a lever means for compressing the spring and releasing the grip of the heads of the lugs at the slots whereby the sections may be disengaged when flow of the fluid is to be terminated, a normally closed, fluid-pressure-opened valve in the passageway in said receiving section operating to close said aperture substantially at the face thereof, automatically operating means for closing said valve upon cessation of pressure in the line, a manually operated valve in said supply section operating to close said passageway substantially at the face thereof, and alternately operating means for maintaining said last mentioned valve in closed and open positions.

References Cited in the file of this patent

UNITED STATES PATENTS

| | | |
|---|---|---|
| 1,927,448 | Terry | Apr. 8, 1932 |

FOREIGN PATENTS

| | | |
|---|---|---|
| 707,434 | Great Britain | Apr. 14, 1954 |